(12) United States Patent
Barriac et al.

(10) Patent No.: US 8,189,719 B2
(45) Date of Patent: May 29, 2012

(54) DETECTION OF TIME-DOMAIN SEQUENCES SENT ON A SHARED CONTROL CHANNEL

(75) Inventors: Gwendolyn D. Barriac, San Diego, CA (US); Dhananjay A. Gore, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 985 days.

(21) Appl. No.: 12/123,807

(22) Filed: May 20, 2008

(65) Prior Publication Data

US 2009/0290661 A1    Nov. 26, 2009

(51) Int. Cl.
*H03D 1/00* (2006.01)
(52) U.S. Cl. ........................................ 375/343
(58) Field of Classification Search ................ 375/130, 375/140, 142, 147, 149, 150, 316, 340, 343; 370/203, 204, 208, 209, 210, 310, 328, 329, 370/335, 336, 337, 342, 343, 344, 345, 347, 370/464, 480, 491
See application file for complete search history.

(56) References Cited

U.S. PATENT DOCUMENTS

| | | | | |
|---|---|---|---|---|
| 5,553,081 A | * | 9/1996 | Downey et al. | 714/709 |
| 6,151,295 A | * | 11/2000 | Ma et al. | 370/203 |
| 6,556,639 B1 | * | 4/2003 | Goldston et al. | 375/365 |
| 6,618,429 B2 | | 9/2003 | Gilhousen et al. | |
| 2005/0111522 A1 | * | 5/2005 | Sung et al. | 375/145 |
| 2006/0007888 A1 | * | 1/2006 | Lee et al. | 370/330 |
| 2007/0041429 A1 | * | 2/2007 | Khandekar | 375/146 |
| 2007/0217552 A1 | * | 9/2007 | Lee et al. | 375/343 |

OTHER PUBLICATIONS

International Search Report and Written Opinion—PCT/US2009/044352, International Search Authority—European Patent Office—Sep. 23, 2009.

* cited by examiner

*Primary Examiner* — David C. Payne
*Assistant Examiner* — Vineeta Panwalkar
(74) *Attorney, Agent, or Firm* — Peng Zhu; James K. O'Hare

(57) ABSTRACT

Techniques for sending and receiving signaling messages in a control segment are described. The control segment may be sent with CDM in multiple OFDM symbols. At a receiver, a received sequence is obtained for the control segment. A time-domain signaling sequence is generated based on a signaling message hypothesized to have been sent in the control segment. A correlating sequence is generated based on the signaling sequence. In one design, the signaling sequence is partitioned into multiple sub-sequences, one sub-sequence for each symbol period in which the control segment was sent. Each sub-sequence is cyclically shifted by an amount determined by a channel tap delay. The correlating sequence is then formed by concatenating all of the cyclically shifted sub-sequences. The correlating sequence may also be generated in other manners. The received sequence is correlated with the correlating sequence to determine whether the signaling message was sent in the control segment.

24 Claims, 12 Drawing Sheets

DETECTION OF TIME-DOMAIN SEQUENCES SENT ON A SHARED CONTROL CHANNEL

BACKGROUND

I. Field

The present disclosure relates generally to communication, and more specifically to techniques for receiving a shared control channel.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA systems.

A communication system typically utilizes various control channels to support data transmission on the forward and reverse links. The forward link (or downlink) refers to the communication link from the base stations to the terminals, and the reverse link (or uplink) refers to the communication link from the terminals to the base stations. For example, the terminals may send signaling on the reverse link to request for data transmission on one or both links, to report channel conditions, to request handoff to stronger base stations, and so on. The signaling sent by the terminals, although beneficial, represents overhead in the system.

There is therefore a need in the art for techniques to efficiently send and receive signaling in a communication system.

SUMMARY

Techniques for sending and receiving signaling messages in a control segment are described herein. The control segment may be sent with a first multiplexing scheme, e.g., code division multiplexing (CDM), in multiple symbol periods. The control segment may be sent within transmission symbols, which may be generated based on a second multiplexing scheme, e.g., orthogonal frequency division multiplexing (OFDM) or single-carrier frequency division multiplexing (SC-FDM).

At a receiver, e.g., a base station, a received sequence may be obtained for a control segment spanning multiple symbol periods. A time-domain signaling sequence may be generated based on a signaling message hypothesized to have been sent in the control segment. A correlating sequence may then be generated based on the signaling sequence in one of several manners. The received sequence may be correlated with the correlating sequence to determine whether the signaling message was sent in the control segment.

In one design for generating the correlating sequence, the signaling sequence is partitioned into multiple sub-sequences, one sub-sequence for each symbol period in which the control segment was sent. Each sub-sequence is cyclically shifted by an amount determined by a channel tap delay. The correlating sequence is then formed by concatenating all of the cyclically shifted sub-sequences. If the channel tap delay exceeds a cyclic prefix length for the transmission symbols (e.g., OFDM symbols), then a portion of each cyclically shifted sub-sequence, which corresponds to the portion of the channel tap delay that exceeds the cyclic prefix length, may be zeroed out.

In another design for generating the correlating sequence, the signaling sequence is partitioned into multiple sub-sequences. A first sequence is then obtained by appending a cyclic prefix to each of the multiple sub-sequences. A second sequence is obtained by appending an appropriate number of zeros, determined by the channel tap delay, to the first sequence. The second sequence is partitioned into multiple second sub-sequences, and a cyclic prefix is removed from each second sub-sequence. The correlating sequence is then generated by concatenating all of the second sub-sequences with the cyclic prefix removed.

Various aspects and features of the disclosure are described in further detail below.

DETAILED DESCRIPTION

Figure 1:
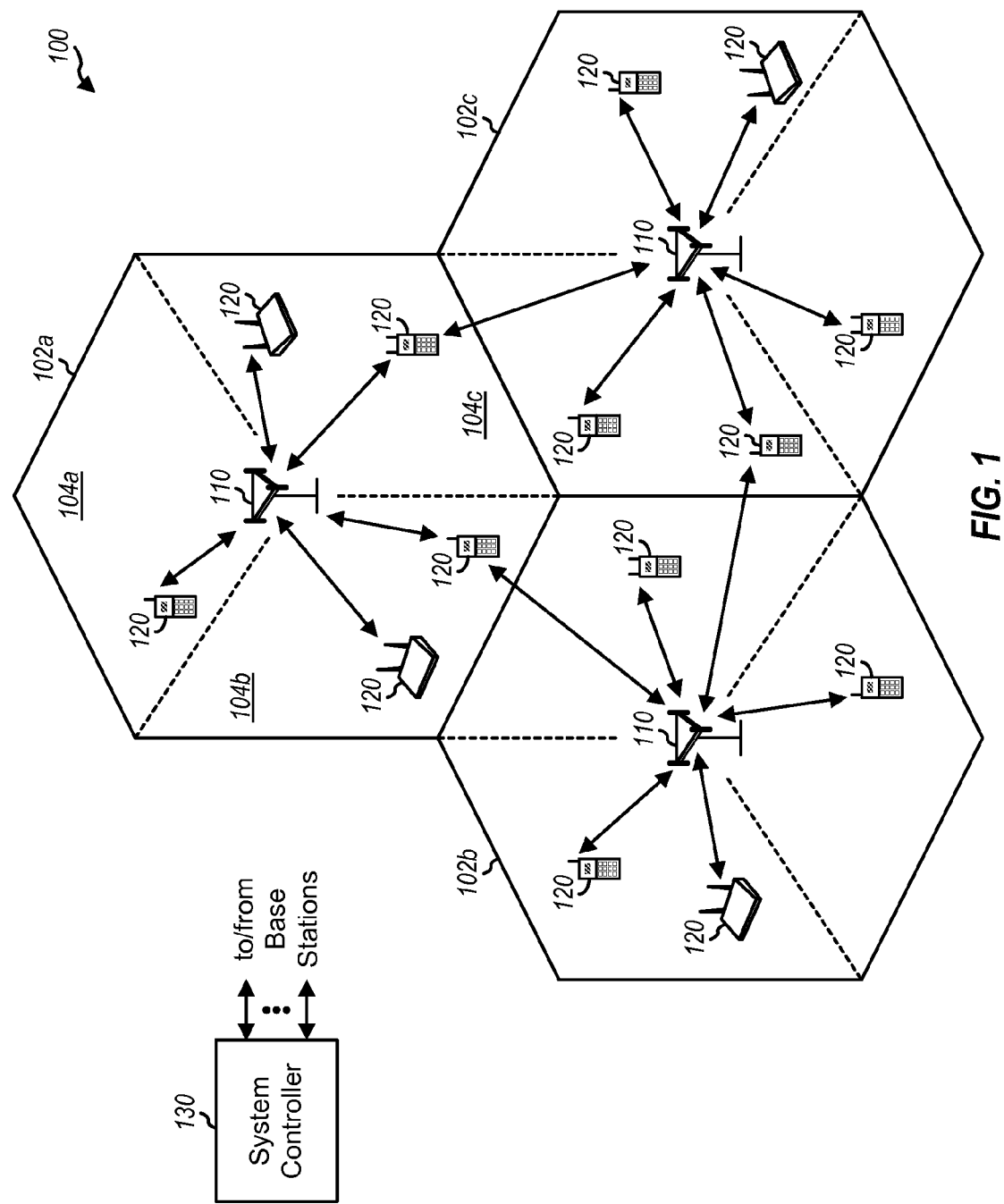
FIG. 1 shows a wireless communication system.

FIG. 1 shows a wireless communication system 100 with multiple base stations 110 and multiple terminals 120. A base station is a station that communicates with the terminals. A base station may also be called, and may contain some or all of the functionality of, an access point, a Node B, an evolved Node B, etc. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area may be served by a respective base transceiver station (BTS). The term "sector" can refer to a BTS and/or its coverage area depending on the context in which the term is used. For a sectorized cell, the BTSs for all sectors of that cell are typically co-located within the base station for the cell.

Terminals 120 are typically dispersed throughout the system, and each terminal may be stationary or mobile. A terminal may also be called, and may contain some or all of the functionality of, an access terminal, a mobile station, a user equipment, a subscriber unit, a station, etc. A terminal may be a cellular phone, a personal digital assistant (PDA), a wireless device, a wireless modem, a handheld device, a laptop computer, etc. A terminal may communicate with zero, one, or multiple base stations on the forward and/or reverse link at any given moment.

For a centralized architecture, a system controller 130 couples to base stations 110 and provides coordination and control for these base stations. System controller 130 may be a single network entity or a collection of network entities. For a distributed architecture, the base stations may communicate with one another as needed.

The techniques described herein may be used for various wireless communication systems such as CDMA, TDMA, FDMA, OFDMA and SC-FDMA systems. A CDMA system utilizes code division multiplexing (CDM) and sends transmissions with different orthogonal codes to orthogonalize these transmissions in the code domain. A TDMA system utilizes time division multiplexing (TDM) and sends transmissions in different time slots to orthogonalize these transmissions in the time domain. An FDMA system utilizes frequency division multiplexing (FDM) and sends transmissions on different subcarriers to orthogonalize these transmissions in the frequency domain. An OFDMA utilizes OFDM, and an SC-FDMA system utilizes SC-FDM. OFDM and SC-FDM partition the system bandwidth into multiple orthogonal subcarriers, which are also referred to as tones, bins, etc. Each subcarrier may be modulated with data. In general, modulation symbols are sent in the frequency domain with OFDM and in the time domain with SC-FDM. The techniques may also be used for wireless communication systems that utilize a combination of multiplexing schemes.

For clarity, certain aspects of the techniques are described below for a system that utilizes OFDM for data channels and CDM for a shared control channel. The techniques may be used for signaling sent on the forward link as well as the reverse link. For clarity, certain aspects of the techniques are described below for signaling sent on the reverse link by the terminals to the base stations.

Figure 2:
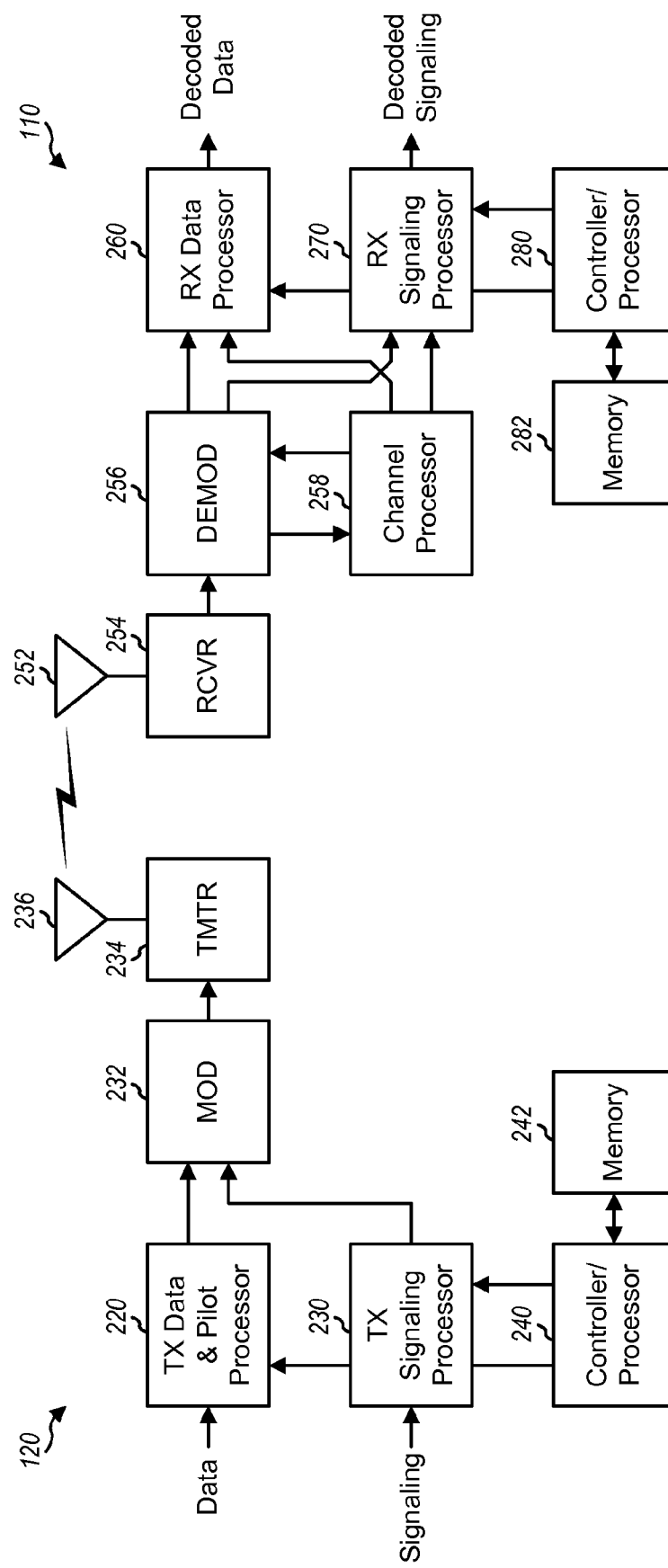
FIG. 2 shows a block diagram of a base station and a terminal.

FIG. 2 shows a block diagram of a design of a base station 110 and a terminal 120, which may be one of the base stations and terminals in FIG. 1. For simplicity, only processing units for transmission on the reverse link are shown in FIG. 2.

At terminal 120, a transmit (TX) data and pilot processor 220 receives traffic data to send on the reverse link, processes the data based on coding and modulation parameters selected for data, and provides data symbols. As used herein, a data symbol is a symbol for data, a pilot symbol is a symbol for pilot, a signaling symbol is a symbol for signaling or control information, a zero symbol is a symbol with a signal value of zero, and a symbol is typically a complex value. The data, pilot and/or signaling symbols may be modulation symbols from modulation schemes such as PSK, QAM, etc. Pilot is data that is known a priori by both a transmitter and a receiver. Processor 220 also processes pilot and provides pilot symbols. A TX signaling processor 230 receives and processes signaling information based on coding and modulation parameters selected for signaling and provides signaling symbols. A modulator (MOD) 232 performs modulation on the data, pilot, and signaling symbols (e.g., for OFDM, SC-FDM, CDM, etc.) and provides output chips. A transmitter (TMTR) 234 processes (e.g., converts to analog, amplifies, filters, and upconverts) the output chips and generates a reverse link signal, which is transmitted via an antenna 236.

At base station 110, an antenna 252 receives the reverse link signal from terminal 120 and provides a received signal to a receiver (RCVR) 254. Receiver 254 processes (e.g., filters, amplifies, downconverts, and digitizes) the received signal and provides received samples. A demodulator (DEMOD) 256 performs demodulation on the received samples (e.g., for OFDM, SC-FDM, CDM, etc.) to obtain received symbols. Demodulator 256 provides received pilot symbols to a channel processor 258, received data symbols to a receive (RX) data processor 260, and received signaling symbols to an RX signaling processor 270. Channel processor 258 estimates the response of the wireless channel from terminal 120 to base station 110 based on the received pilot symbols and provides channel estimates (e.g., channel impulse response estimates, channel gain estimates, noise and interference estimates, etc.) to processor 260 and/or 270. RX data processor 260 processes the received data symbols in a manner complementary to the processing by TX data processor 220 and provides decoded data for terminal 120. RX signaling processor 270 processes the received signaling symbols in a manner complementary to the processing by TX signaling processor 230 and provides decoded signaling for terminal 120.

Controllers 240 and 280 direct the operation at terminal 120 and base station 110, respectively. Memories 242 and 282 store program codes and data for terminal 120 and base station 110, respectively.

Figure 3:
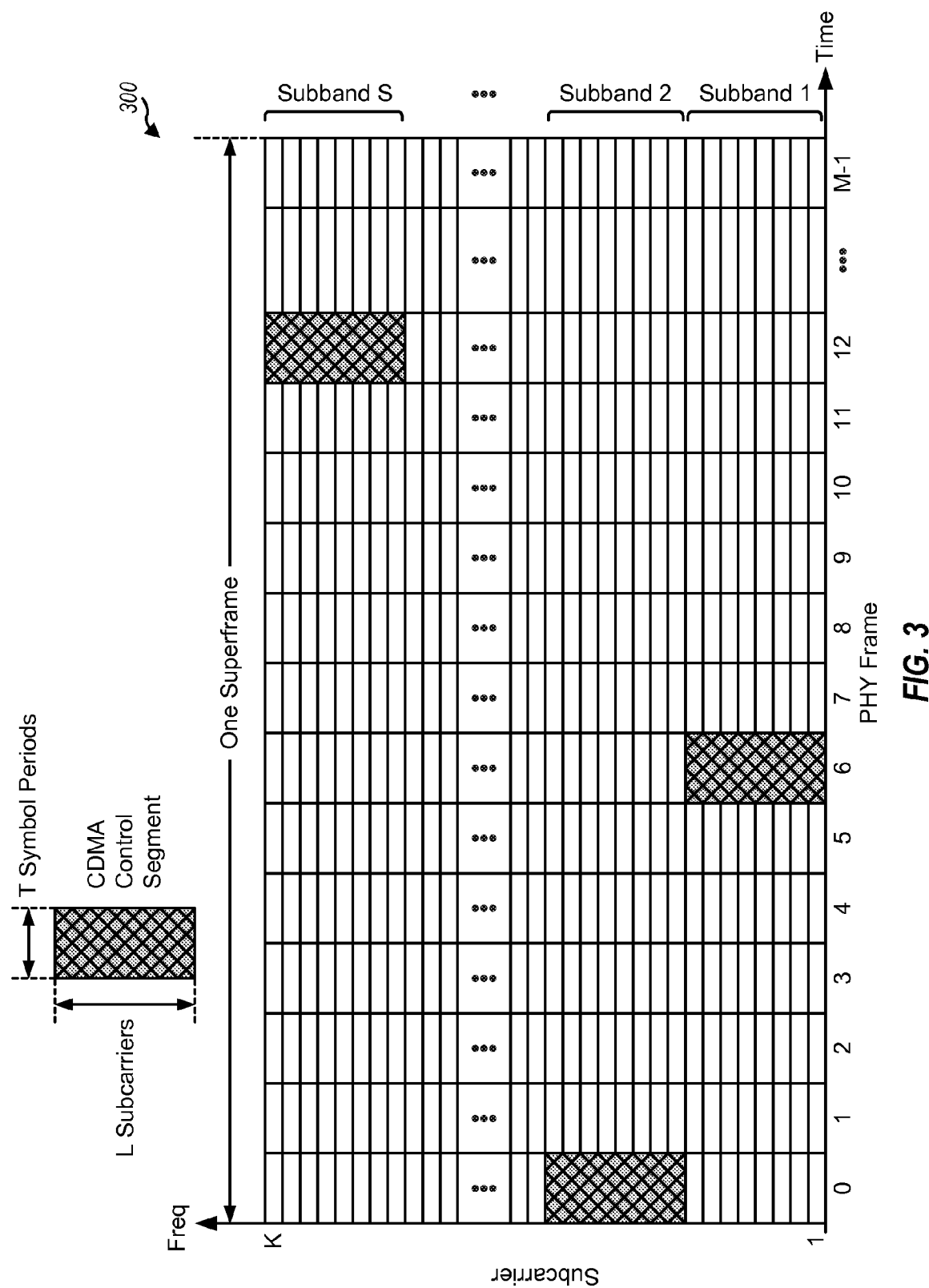
FIG. 3 shows a superframe structure.

FIG. 3 shows a design of a superframe structure 300, which may be used for the reverse link in system 100. The transmission timeline may be partitioned into units of superframes. Each superframe may span a particular time duration, which may be fixed or configurable. Each superframe may include M physical layer (PHY) frames, or simply, frames. Each frame may span T symbol periods, where M and T may be any suitable integer values.

FIG. 3 also shows a subcarrier structure. The system bandwidth may be partitioned into multiple (K) orthogonal subcarriers that may be assigned indices of 1 through K. In a spectrally shaped system, only a subset of the K total subcarriers may be used for transmission, and the remaining subcarriers may serve as guard subcarriers to allow the system to meet spectral mask requirements. For simplicity, the following description assumes that all K total subcarriers are usable. The K total subcarriers may be partitioned into multiple (S) subbands, and each subband may include L subcarriers, where S and L may be any suitable integer values, e.g., $K=S \cdot L$.

FIG. 3 also shows a design of a CDMA control segment that supports transmission of signaling on the reverse link. The CDMA control segment may occupy a block of time and frequency resources and may support various signaling/control channels such as, e.g., a channel quality indicator channel (CQICH), a request channel (REQCH), a beamforming feedback channel (BFCH), a subband feedback channel (SFCH), a pilot channel (PICH), an access channel (ACH), etc. In the design shown in FIG. 3, the CDMA control segment covers L subcarriers in one subband and is sent in every 6-th PHY frame. The CDMA control segment may hop across the system bandwidth from CDMA frame to CDMA frame (as shown in FIG. 3) or may be sent on a fixed set of L subcarriers (not shown in FIG. 3). A CDMA frame is a frame in which the CDMA control segment is sent. In general, the CDMA control segment may be sent at any rate and in a time frequency block of any dimension. Multiple terminals may share the CDMA control segment and send signaling in this control segment whenever there is signaling to send. This may be more efficient than assigning dedicated time frequency resources to each terminal for sending signaling, especially when signaling is sent sporadically.

The signaling to be sent in the CDMA control segment may be processed in various manners. In one design, a B-bit signaling message M to be sent on a given signaling channel may be processed as follows. The signaling message M may be encoded by mapping this message to a coded message W, which may be a Walsh sequence of length $2^B$. $2^B$ different message values may be mapped to $2^B$ different Walsh sequences of length $2^B$. The coded message W may be repeated and channelized with a channelization sequence $F_C$ to obtain a channelized message V. The channelization sequence $F_C$ may be generated based on a pseudo-random binary sequence from a linear feedback shift register (LFSR). The LFSR may be initialized with a seed value that may be dependent on various factors such as the signaling channel type, an index for a PHY frame in which the message is sent, an identifier for a target base station, etc.

The channelized message V may be summed with other channelized messages (if any) to obtain a composite sequence, which may be further scrambled with a scrambling sequence $F_S$ to obtain a signaling sequence. The scrambling sequence $F_S$ may be specific for both the target base station and the terminal. This may then allow the terminal to send the signaling message M to the target base station and for the target base station to identify the terminal. If only message M is sent, then a signaling sequence Z for this message may be expressed as:

$$Z = W \cdot F_C F_S, \qquad \text{Eq (1)}$$

where the multiplication in equation (1) is on a sample-by-sample basis.

In one design, a 10-bit signaling message M is mapped to a Walsh sequence W of length 1024, which is repeated four times to obtain 4096 samples. The repeated Walsh sequence is then channelized with a 4096-sample channelization sequence $F_C$ and further scrambled with a 4096-sample scrambling sequence $F_S$ to obtain a signaling sequence Z containing 4096 samples.

In general, a time-domain signaling segment Z may be generated for a signaling message M in various manners. The signaling message may be encoded with any coding scheme, with the mapping to a Walsh sequence being one example coding scheme. The signaling message may also be channelized, scrambled and/or processed in any manner. The signaling message M and the signaling sequence Z may also have any length. For clarity, much of the following description assumes that the signaling sequence Z contains 4096 samples and is sent in a CDMA control segment covering L=512 subcarriers in T=8 symbol periods.

Figure 4A:
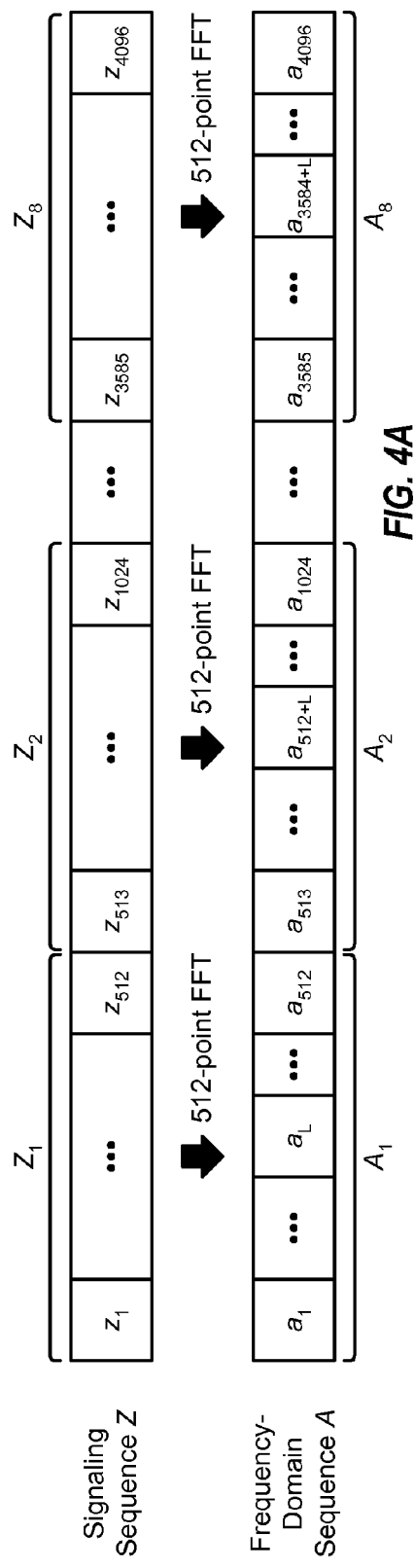
FIGS. 4A and 4B illustrate the processing to send a signaling sequence in a CDMA control segment.

FIG. 4A illustrates the processing to send the time-domain signaling sequence Z in the CDMA control segment. The signaling sequence Z contains 4096 samples $z_1$ through $z_{4096}$ and may be partitioned into eight sub-sequences $Z_1$ through $Z_8$, with each sub-sequence $Z_m$ containing 512 consecutive samples, where m=1, ..., 8. Each sub-sequence $Z_m$ may be converted to the frequency domain with a 512-point fast Fourier transform (FFT) to obtain a corresponding frequency-domain sub-sequence $A_m$ containing 512 symbols. A frequency-domain sequence A containing 4096 symbols $a_1$ through $a_{4096}$ may be obtained by concatenating the eight sub-sequences $A_1$ through $A_8$.

Figure 4B:
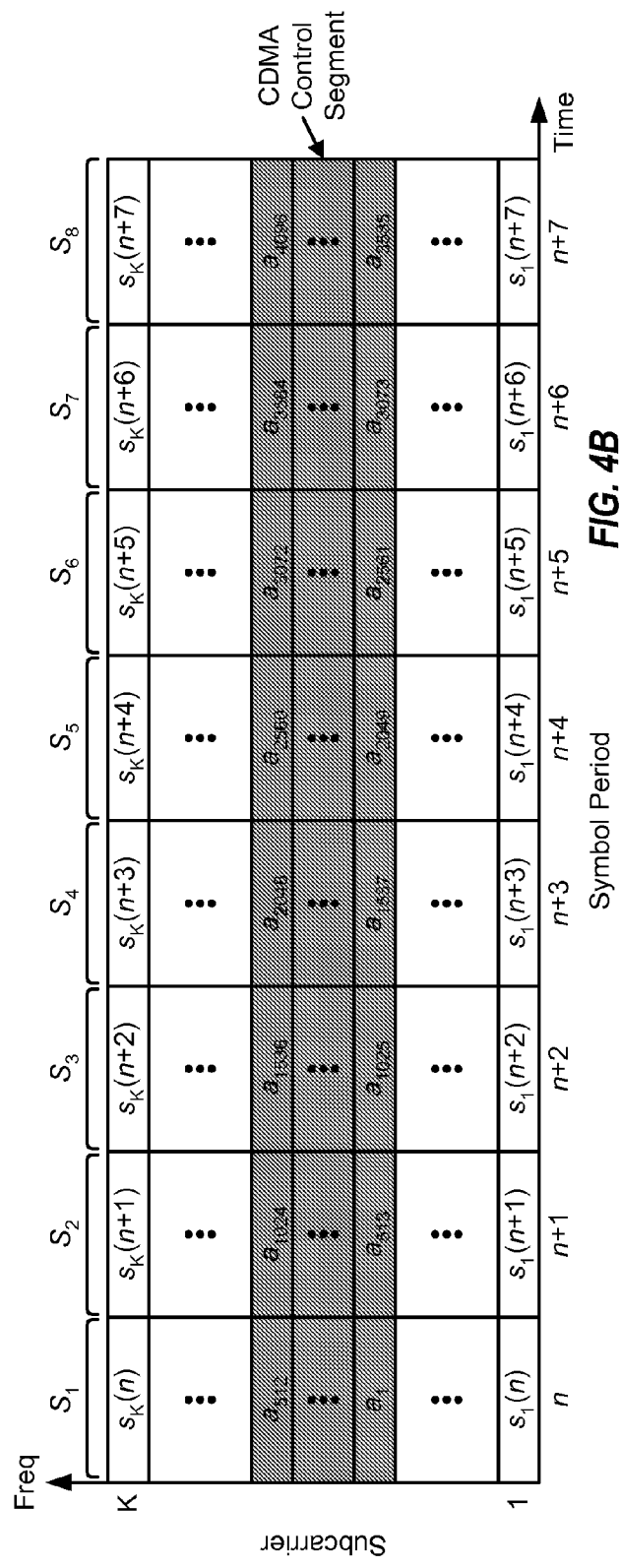

FIG. 4B shows an example mapping of the symbols in the frequency-domain sequence A to the CDMA control segment. The 512 symbols $a_1$ through $a_{512}$ in sub-sequence $A_1$ may be mapped to 512 subcarriers used for the CDMA control segment in symbol period n, the 512 symbols $a_{513}$ through $a_{1024}$ in sub-sequence $A_2$ may be mapped to 512 subcarriers used for the CDMA control segment in symbol period n+1, and so on, and the 512 symbols $a_{3585}$ through $a_{4096}$ in sub-sequence $A_8$ may be mapped to 512 subcarriers used for the CDMA control segment in symbol period n+7. Data symbols, pilot symbols, and/or zero symbols, which are denoted as $s_1(n)$ through $s_K(n+7)$ in FIG. 4B, may be mapped to the remaining K−512 subcarriers in each of symbol periods n through n+7. The K total symbols in symbol period n are denoted as $S_1$, the K total symbols in symbol period n+1 are denoted as $S_2$, and so on, and the K total symbols in symbol period n+7 are denoted as $S_8$.

Figure 5:
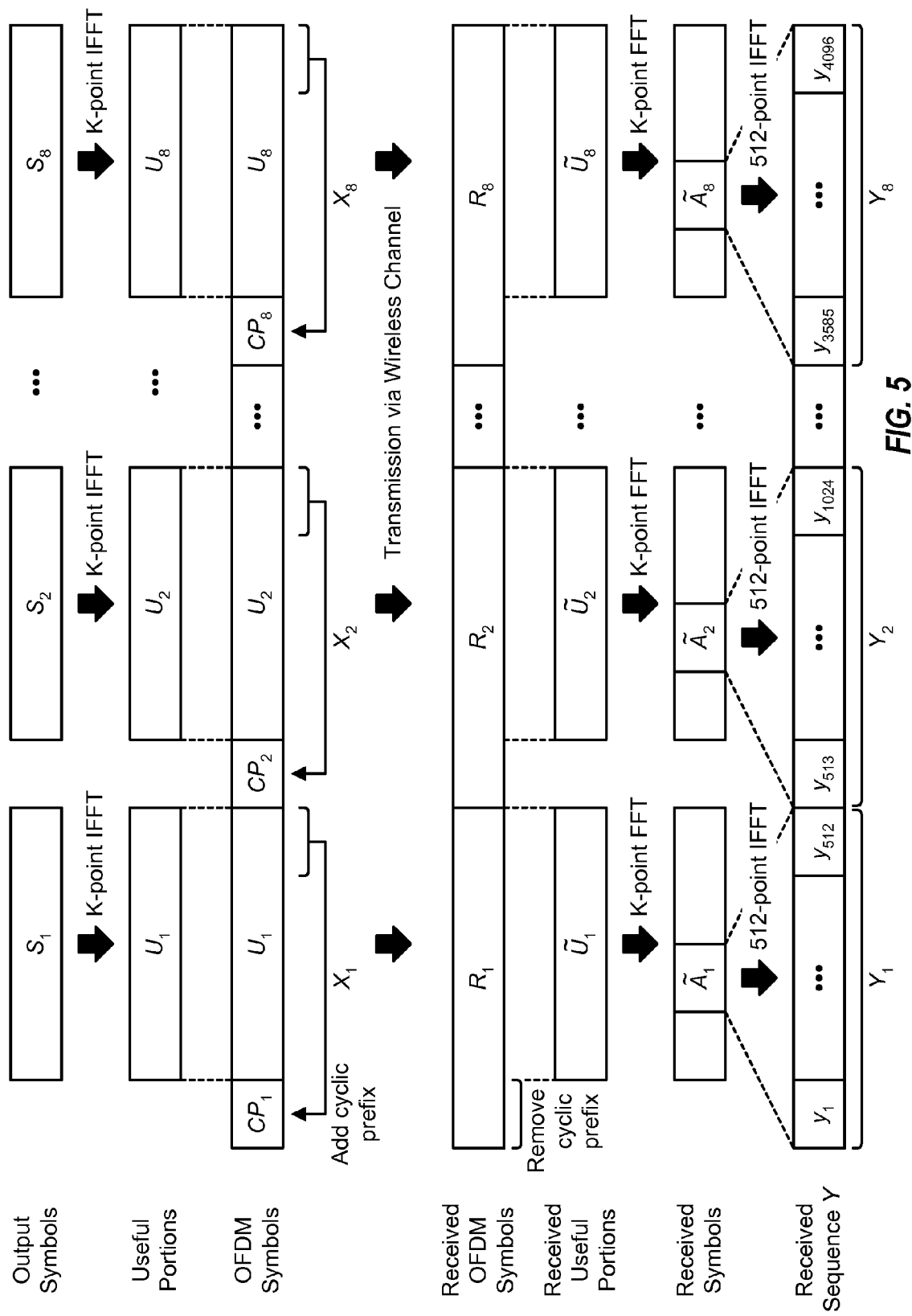
FIG. 5 shows modulation and demodulation for the CDMA control segment.

FIG. 5 shows modulation and demodulation for symbol periods in which the CDMA control segment is sent. For clarity, the following description assumes that OFDM is used for these symbol periods.

At the terminal, the K total symbols $S_m$ in each symbol period may be transformed to the time domain with a K-point inverse fast Fourier transform (IFFT) to obtain a useful portion $U_m$ containing K time-domain chips, for m=1, ..., 8. The last $N_{cp}$ chips in the useful portion $U_m$ may be copied and appended to the front of the useful portion to form an OFDM symbol $X_m$ containing $N = K + N_{cp}$ chips. The repeated portion is often referred to as a cyclic prefix (CP) or a guard interval, and $N_{cp}$ is the cyclic prefix length. The cyclic prefix is used to combat inter-symbol interference (ISI) caused by frequency selective fading in a wireless channel with delay spread. Each OFDM symbol $X_m$ may be transmitted in one OFDM symbol period (or simply, one symbol period), which may be equal to $N = K + N_{cp}$ chip periods. In one design, K=2048, $N_{cp}$=128, and N=2176. Other values may also be used for K, $N_{cp}$, and N.

At the base station, a received OFDM symbol $R_m$ containing N samples may be obtained in each symbol period. The start of each OFDM symbol may be estimated based on various techniques known in the art, e.g., based on a channel impulse response estimate for the wireless channel between the terminal and the base station. The cyclic prefix in each received OFDM symbol $R_m$ may be removed to obtain a received useful portion $\tilde{U}_m$ containing K samples. A K-point FFT may be performed on each received useful portion $\tilde{U}_m$ to obtain K received symbols for K total subcarriers. These K received symbols include a sub-sequence $\tilde{A}_m$ containing 512 received symbols on the 512 subcarriers used for the CDMA control segment. A 512-point IFFT may be performed on each received symbol sub-sequence $\tilde{A}_m$ to obtain a received sub-sequence $Y_m$ containing 512 samples. A received sequence Y may be obtained by concatenating the eight sub-sequences $Y_1$ through $Y_8$.

The base station may process the received sequence Y to determine which signaling message, if any, was sent in the CDMA control segment. The base station may correlate the received sequence Y with each possible signaling sequence to determine whether or not that signaling sequence was sent. The correlation of the received sequence Y with a hypothesized signaling sequence C, which is one of the possible signaling sequences, is described below.

The impulse response of the wireless channel between the terminal and the base station may be estimated, e.g., based on received pilot symbols. The channel impulse response estimate may contain $N_{tap}$ channel taps, where in general $N_{tap} \geq 1$. Each channel tap may be associated with a particular complex gain $h_i$ and a particular delay $d_i$, for i=1, ..., $N_{tap}$. The channel tap delay $d_i$ may be given in units of chip period. The received sequence Y may be correlated with the hypothesized signaling sequence C for each of the $N_{tap}$ channel taps. The correlation results for all $N_{tap}$ channel taps may be combined and used to determine whether or not signaling sequence C was sent in the CDMA control segment.

Figure 6:
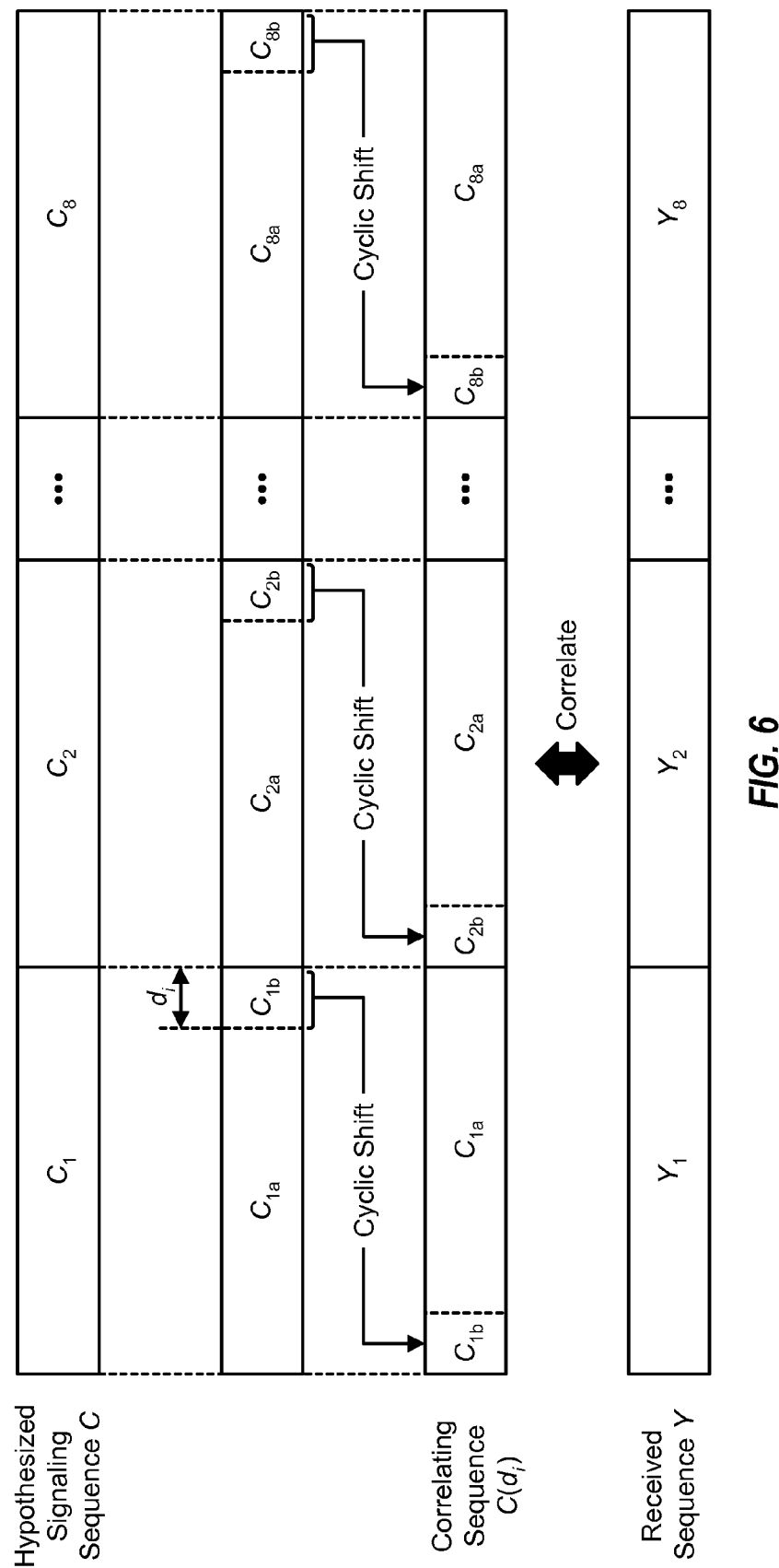
FIG. 6 shows correlation between a received sequence and a hypothesized signaling sequence.

FIG. 6 shows correlation between the received sequence Y and the hypothesized signaling sequence C for one channel tap with a delay $d_i$ that is less than or equal to the cyclic prefix length, or $d_i \leq N_{cp}$. The 4096-sample hypothesized signaling sequence C may be partitioned into eight sub-sequences $C_1$ through $C_8$, as described above for the signaling sequence Z. Each sub-sequence $C_m$ may be cyclically or circularly shifted by $d_i$ chip periods by taking the last $N_i$ samples of sub-sequence $C_m$ and moving these $N_i$ samples to the front of sub-sequence $C_m$. $N_i$ is determined by the channel tap delay $d_i$, the number of output chips in the useful portion (K), and the number of samples per sub-sequence (L), or $N_i = L \cdot d_i/K$ where $d_i$ is given in units of chip period. For example, if a sub-sequence of L=512 samples is sent in a useful portion of K=2048 chips, then $N_i = 512 \cdot d_i/2048 = d_i/4$. A correlating sequence $C(d_i)$ may be formed by concatenating the eight cyclically shifted sub-sequences.

The correlating sequence $C(d_i)$ may be correlated with the received sequence Y, as follows:

$$Q(d_i) = \frac{1}{4096} \cdot \left| \sum_{l=1}^{4096} c_l(d_i) \cdot y_l \right|^2, \quad \text{Eq (2)}$$

where
$c_l(d_i)$ is the l-th sample in the correlating sequence $C(d_i)$,
$y_l$ is the l-th sample in the received sequence Y, and
$Q(d_i)$ is a correlation result for channel tap delay $d_i$.

As shown in equation (2), the correlation may be performed by multiplying each sample in the correlating sequence $C(d_i)$ with a corresponding sample in the received sequence Y, accumulating the products across the length of these sequences, and computing the squared magnitude of the accumulated result to obtain the correlation result $Q(d_i)$. Sequences $C(d_i)$ and Y may be sampled at the sample rate, as shown in equation (2). Alternatively, sequences $C(d_i)$ and Y may be oversampled at multiple times the sample rate to improve time resolution, and the correlation may be performed across samples at sub-sample time resolution.

The eight sub-sequences $C_1$ through $C_8$ of the hypothesized signaling sequence C may be cyclically shifted by different amounts corresponding to different channel tap delays $d_1$ through $d_{N_{tap}}$. For each channel tap delay $d_i$, correlation may be performed as shown in equation (2) to obtain the correlation result $Q(d_i)$ for that channel tap delay. The correlation results for all $N_{tap}$ channel tap delays may be combined to obtain a final correlation result for the hypothesized signaling sequence C, as described below.

FIG. 6 shows cyclic shifting of the eight sub-sequences $C_1$ through $C_8$ for the case in which the channel tap delay $d_i$ is less than or equal to the cyclic prefix length $N_{cp}$. When this is the case, most of the energy of the channel tap is captured by the cyclic prefix in each OFDM symbol. However, when the channel tap delay $d_i$ is greater than the cyclic prefix length $N_{cp}$, which is commonly referred to as excess delay spread, some of the channel tap energy is not captured by the cyclic prefix. Excess delay spread may be handled in various manners.

In one design for performing correlation with excess delay spread, the eight sub-sequences $C_1$ through $C_8$ are each cyclically shifted by the channel tap delay $d_i$, as shown in FIG. 6. The cyclically shifted sub-sequences are correlated with the corresponding received sub-sequences $Y_1$ through $Y_8$. In this design, samples in the received sequence Y corresponding to the excess delay act as noise in the correlation.

Figure 7:
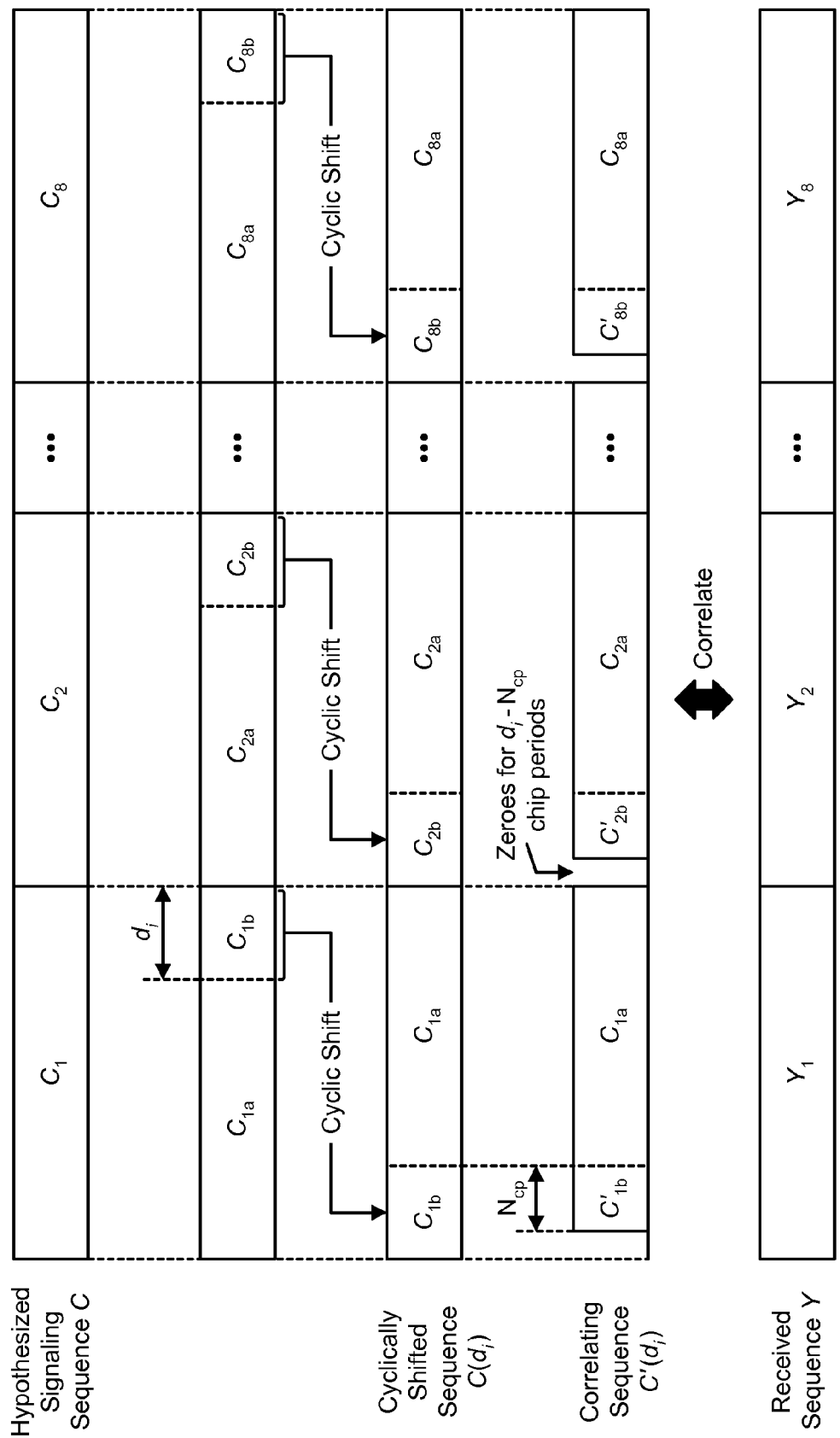
FIGS. 7 and 8 show two designs for correlation between the received sequence and the hypothesized signaling sequence with excessive delay spread.

FIG. 7 shows another design for correlation between the received sequence Y and the hypothesized signaling sequence C with excessive delay spread. The 4096-sample hypothesized signaling sequence C may be partitioned into eight sub-sequences $C_1$ through $C_8$. Each sub-sequence $C_m$ may be cyclically shifted by $d_i$ chip periods (or $N_i$ samples), where $d_i > N_{cp}$ with excessive delay spread. For each cyclically shifted sub-sequence, the first $d_i - N_{cp}$ chip periods correspond to extra delay outside of the cyclic prefix length and may be set to zero to obtain a truncated sub-sequence containing leading zeros for the first $d_i - N_{cp}$ chip periods. The zeroed-out portion of each truncated sub-sequence corresponds to a portion that is received prior to the channel tap and hence contains mostly noise and no useful signal. A correlating sequence $C'(d_i)$ may be obtained by concatenating the eight truncated sub-sequences with leading zeros. The correlating sequence $C'(d_i)$ may be correlated with the received sequence Y as shown in equation (2).

Figure 8:
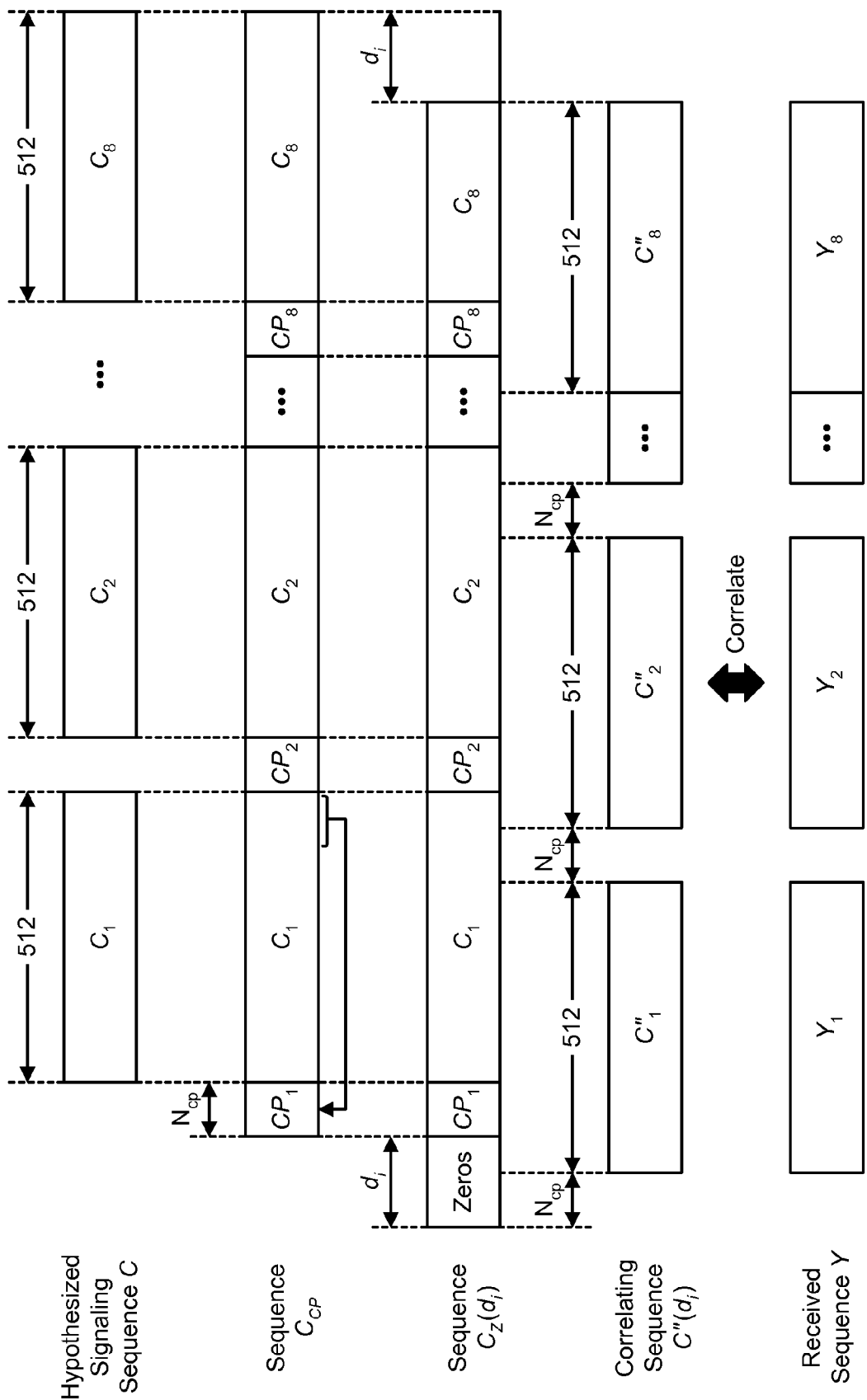

FIG. 8 shows yet another design for correlation between the received sequence Y and the hypothesized signaling sequence C with excessive delay spread. The 4096-sample hypothesized signaling sequence C may be partitioned into eight sub-sequences $C_1$ through $C_8$. A cyclic prefix may then be appended to each sub-sequence $C_m$ by copying $N_S$ samples in the last $N_{cp}$ chip periods of sub-sequence $C_m$ and appending these $N_S$ samples at the start of the sub-sequence, where $N_S = L \cdot N_{cp}/K$. For example, if the sub-sequence contains L=512 samples and the useful portion contains K=2048 chips, then $N_S = 512 \cdot N_{cp}/2048 = N_{cp}/4$. A sequence $C_{CP}$ may be formed by concatenating the eight sub-sequences with cyclic prefixes. A sequence $C_Z(d_i)$ may be formed by appending $N_i$ zeros for $d_i$ chip periods at the start of sequence $C_{CP}$ and discarding the last $N_i$ samples of sequence $C_{CP}$. Sequence $C_Z(d_i)$ may then be partitioned into eight sub-sequences of length $L+N_{cp}$. The first $N_S$ samples in the first $N_{cp}$ chip periods of each sub-sequence correspond to the cyclic prefix and may be removed to obtain a sub-sequence $C''_m$. A correlating sequence $C''(d_i)$ may be obtained by concatenating the eight sub-sequences $C''_1$ through $C''_8$. The correlating sequence $C''(d_i)$ may be correlated with the received sequence Y as shown in equation (2).

For clarity, generation of correlating sequences is described below for a simple example in which the signaling sequence Z contains 16 samples and is sent in a CDMA control segment covering L=8 subcarriers in T=2 symbol periods. For simplicity, the cyclic prefix length and the channel tap delay are given in units of sample periods (instead of chip periods). The signaling sequence Z may be given as:

$$Z = \underbrace{z_1\ z_2\ z_3\ z_4\ z_5\ z_6\ z_7\ z_8}_{sub\text{-}sequence\ 1}\ \underbrace{z_9\ z_{10}\ z_{11}\ z_{12}\ z_{13}\ z_{14}\ z_{15}\ z_{16}}_{sub\text{-}sequence\ 2}.$$

In this example, the cyclic prefix length is $N_{CP}=2$ sample periods, and the channel tap delay is $d_i=3$ sample periods, which is a case with excess delay spread.

For the design shown in FIG. 7, a cyclically-shifted sequence $C(d_i)$ with $d_i=3$ may be given as:

$$C(d_i) = \underbrace{z_6\ z_7\ z_8\ z_1\ z_2\ z_3\ z_4\ z_5}_{sub\text{-}sequence\ 1}\ \underbrace{z_{14}\ z_{15}\ z_{16}\ z_9\ z_{10}\ z_{11}\ z_{12}\ z_{13}}_{sub\text{-}sequence\ 2}.$$

A correlating sequence $C'(d_i)$ is obtained by zeroing out the first $d_i - N_{cp} = 1$ sample in each sub-sequence, as follows:

$$C'(d_i) = 0 \underbrace{z_7\ z_8\ z_1\ z_2\ z_3\ z_4\ z_5}_{\text{sub-sequence 1}}\ 0 \underbrace{z_{15}\ z_{16}\ z_9\ z_{10}\ z_{11}\ z_{12}\ z_{13}}_{\text{sub-sequence 2}}.$$

For the design shown in FIG. 8, a sequence $C_{CP}$ is obtained by appending a cyclic prefix of length $N_{cp}=2$ to each sub-sequence, as follows:

$$C_{CP} = \underbrace{z_7\ z_8\ z_1\ z_2\ z_3\ z_4\ z_5\ z_6\ z_7\ z_8}_{\text{sub-sequence 1}}\ \underbrace{z_{15}\ z_{16}\ z_9\ z_{10}\ z_{11}\ z_{12}\ z_{13}\ z_{14}\ z_{15}\ z_{16}}_{\text{sub-sequence 2}}.$$

A sequence $C_Z(d_i)$ with $d_i=3$ is obtained by appending three zeros at the start of sequence $C_{CP}$ and discarding the last three samples of sequence $C_{CP}$, as follows:

$$C_Z(d_i) = 0\ 0\ 0\ \underbrace{z_7\ z_8\ z_1\ z_2\ z_3\ z_4\ z_5\ z_6\ z_7\ z_8}_{\text{sub-sequence 1}}\ \underbrace{z_{15}\ z_{16}\ z_9\ z_{10}\ z_{11}\ z_{12}\ z_{13}}_{\text{sub-sequence 2}}.$$

A correlating sequence $C''(d_i)$ is obtained by removing the first $N_{cp}=2$ samples of each sub-sequence in sequence $C_Z(d_i)$, as follows:

$$C''(d_i) = 0 \underbrace{z_7\ z_8\ z_1\ z_2\ z_3\ z_4\ z_5}_{\text{sub-sequence 1}}\ \underbrace{z_8\ z_{15}\ z_{16}\ z_9\ z_{10}\ z_{11}\ z_{12}\ z_{13}}_{\text{sub-sequence 2}}.$$

It can be shown that correlating sequence $C'(d_i)$ is the same as correlating sequence $C''(d_i)$ for $d_i \leq N_{cp}$. For the example described above, if $d_i=1$, then the correlating sequences may be expressed as:

$$C'(d_i = 1) = C''(d_i = 1) = \underbrace{z_8\ z_1\ z_2\ z_3\ z_4\ z_5\ z_6\ z_7}_{\text{sub-sequence 1}}\ \underbrace{z_{16}\ z_9\ z_{10}\ z_{11}\ z_{12}\ z_{13}\ z_{14}\ z_{15}}_{\text{sub-sequence 2}}.$$

Several designs for generating correlating sequences have been described above. The correlating sequences may also be generated in other manners. For example, sequence $C(d_i)$ in FIG. 7 may be used directly as the correlating sequence, without zeroing out even for excess delay spread.

A correlation result may be obtained for each channel tap delay as shown in equation (2). In one design, the correlation results for all $N_{tap}$ channel tap delays may be combined, as follows:

$$Q = \frac{1}{N_{tap}} \cdot \sum_{i=1}^{N_{tap}} Q(d_i) = \|\langle C, Y \rangle\|^2, \qquad \text{Eq (3)}$$

where Q is a final correlation result, and
<C,Y> denotes correlation between the hypothesized signaling sequence C and the received sequence Y.

In another design, $Q(d_i)$ is compared against a threshold and either accumulated if it exceeds the threshold or discarded otherwise. In yet another design, the final result Q is equal to the largest $Q(d_i)$ for all $N_{tap}$ channel taps. The final result Q may also be obtained in other manners. The final result Q may be compared against a threshold $Q_{th}$ to determine whether or not the hypothesized signaling sequence C was received, as follows:

If $Q > Q_{th}$, then declare signaling sequence C was received, and

If $Q \leq Q_{th}$, then declare signaling sequence C was not received, where $Q_{th}$ is the threshold used for signaling detection.

The threshold $Q_{th}$ may be selected to achieve a target probability of false alarm ($P_{fa}$), a target probability of missed detection ($P_{md}$), a target probability of error ($P_{err}$), etc. False alarm refers to detection of a signaling message when none was sent. Missed detection (or erasure) refers to failure to detect a signaling message that was sent. Message error refers to detection of one signaling message when another signaling message was sent. Probability of false alarm may be applicable for specific messages that may be sent, e.g., access probes sent on the access channel. Probability of error may be applicable for messages that may be sent with different values, e.g., CQI messages sent on the CQI channel. Probability of missed detection may be applicable for both types of messages.

The threshold $Q_{th}$ may be selected such that the probability of $Q > Q_{th}$ is less than P percents when sequence C is not time aligned with sequence Y, where $P_{fa} \leq P$ and/or $P_{err} \leq P$. The received sequence may be expressed as:

$$Y = \sum_i h_i \cdot Z(d_i) + N, \qquad \text{Eq (4)}$$

where
$h_i$ is the i-th channel tap,
$Z(d_i)$ is the signaling sequence Z delayed by $d_i$ for the i-th channel tap, and
N is total noise observed by the signaling sequence Z.

The correlation between the hypothesized signaling sequence C and the received sequence Y may be expressed as:

$$\langle C, Y \rangle = \sum_i h_i \cdot \langle C, Z(d_i) \rangle + \langle C, N \rangle, \qquad \text{Eq (5)}$$

The hypothesized signaling sequence C is one of the possible signaling sequences and may or may not be equal to the transmitted signaling sequence Z. The term $\langle C, Z(d_i) \rangle$ is typically small if sequence C is not equal to sequence Z and/or not time aligned with $Z(d_i)$ in the received sequence. The term $\langle C, N \rangle$ represents correlation noise and may be approximated as $\langle C, N \rangle = \|C\|^2 \cdot \sigma^2$, where $\sigma^2$ is the per-tap variance of the noise. The per-tap noise variance $\sigma^2$ may be estimated based on the energy of the channel taps in the channel impulse response estimate. From equation (5), the noise energy is Chi-squared with 2R degrees of freedom, where R is the number of received antennas at the base station. The threshold $Q_{th}$ may be selected such that the noise energy does not exceed $Q_{th}$ for P percent of the time. P may be given as:

$$P = \frac{X}{N_{hyp}}, \qquad \text{Eq (6)}$$

where X is the desired probability of false alarm and $N_{hyp}$ is the number of hypotheses being tested. $N_{hyp}$ may be equal to the number of possible signaling sequences to be tested and the number of times each such signaling sequence is tested.

The threshold $Q_{th}$ may also be selected to achieve the target probability of missed detection. When the hypothesized signaling sequence C is equal to sequence Z and time-aligned with $Z(d_i)$ in the received sequence Y, the correlation in equation (5) may be expressed as:

$$\langle C, Y \rangle = h_1 \cdot \langle C, Z(d_1) \rangle + \sum_{i \neq 1} h_i \cdot \langle C, Z(d_i) \rangle + \langle C, N \rangle. \quad \text{Eq (7)}$$

Equation (7) assumes that the correlation is performed for one channel tap with delay of $d_1$. The term $h_1 \cdot \langle C, Z(d_1) \rangle$ represents the signal portion captured by the correlation. The summation term includes the signal portion that is not captured by the correlation and should be small and negligible. The probability of missed detection is the probability that $\|\langle C,Y\rangle\|^2$ is less than the threshold $Q_{th}$ even though the correlating sequence C is time aligned with $Z(d_i)$ in the received sequence Y. Equivalently, the probability of missed detection may be given as the probability of $\|\langle C,Z(d_1)\rangle\|^2$ being less than $Q_{th}-\|\langle C,N\rangle\|^2$, where $\|\langle C,N\rangle\|^2$ may be determined based on the Chi-squared distribution of the noise energy.

Figure 9:
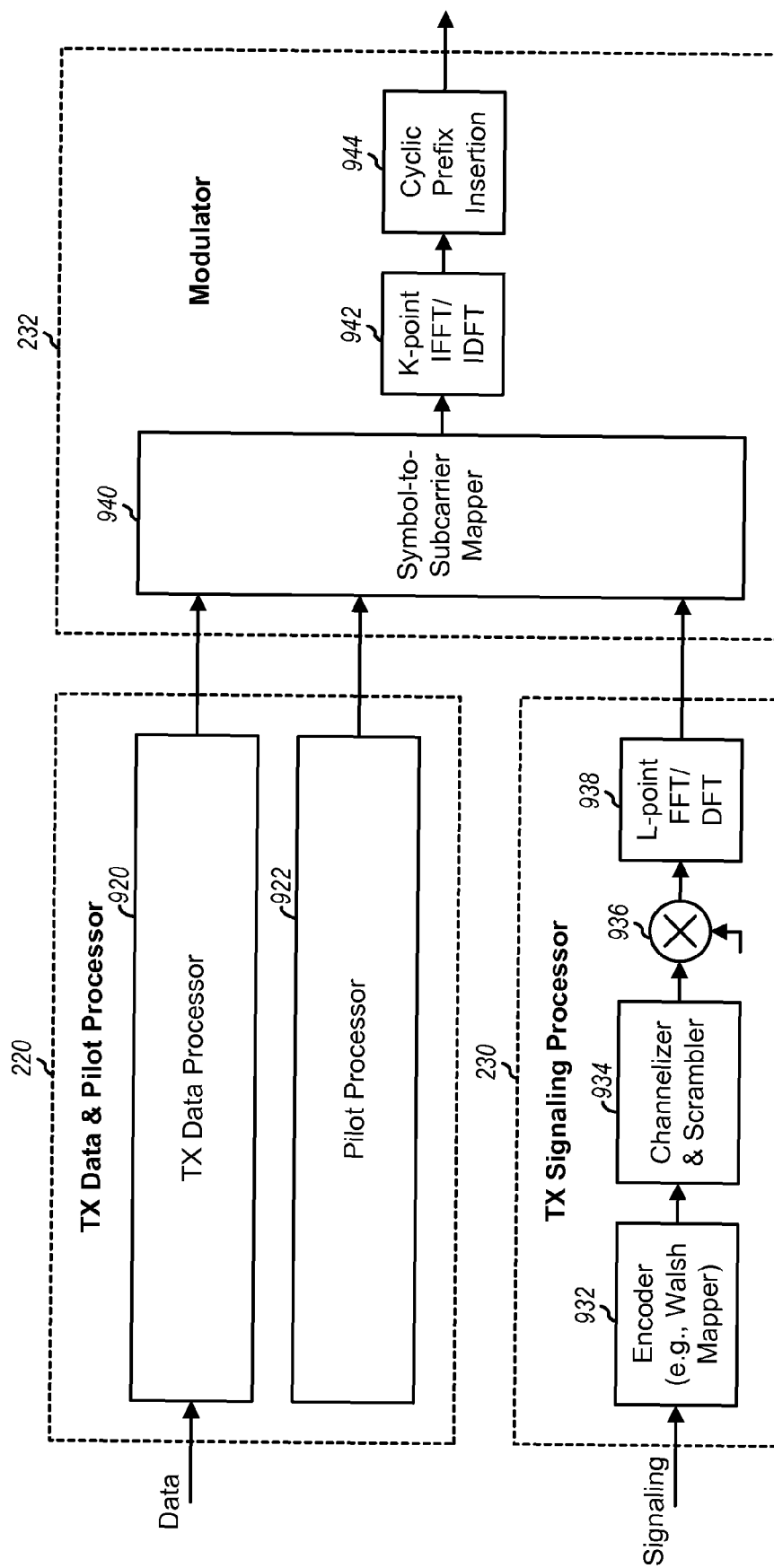
FIG. 9 shows a block diagram of processing units at the terminal.

FIG. 9 shows a block diagram of a design of TX data and pilot processor 220, TX signaling processor 230, and modulator 232 at terminal 120 in FIG. 2. Processor 220 includes a TX data processor 920 and a pilot processor 922. Processor 920 receives data to send on the reverse link, processes (e.g., formats, encodes, interleaves, and symbol maps) the data, and provides data symbols to modulator 232. Processor 922 processes pilot and provides pilot symbols to modulator 232.

Within TX signaling processor 230, an encoder 932 receives signaling messages to send in the CDMA control segment and encodes each message to obtain a coded message. A channelizer and scrambler 934 multiplies the coded message with a channelization sequence and further scrambles the channelized message with a scrambling sequence to obtain a time-domain signaling sequence, e.g., as shown in equation (1). In general, each message may be processed in any manner to obtain a signaling sequence. Although not shown in FIG. 9, multiple signaling sequences may be summed or combined and sent concurrently. A multiplier 936 multiplies the output of channelizer and scrambler 934 with a gain and provides an output sequence. An FFT/DFT unit 938 performs FFT/DFT on the sequence from multiplier 936 and provides a corresponding frequency-domain sequence A, e.g., as shown in FIG. 4A.

In the design shown in FIG. 9, modulator 232 performs OFDM modulation. Within modulator 232, a symbol-to-subcarrier mapper 940 receives the data symbols from processor 920, the pilot symbols from processor 922, and the signaling symbols from processor 230. Mapper 940 maps the data symbols, pilot symbols, signaling symbols, and zero symbols to the proper subcarriers in each symbol period and provides K output symbols for the K total subcarriers in each symbol period. An IFFT/IDFT unit 942 performs a K-point IFFT/IDFT on the K output symbols in each symbol period and provides a useful portion for that symbol period. A cyclic prefix insertion unit 944 appends a cyclic prefix to each useful portion and provides a corresponding OFDM symbol. Modulator 232 may also perform modulation for other multiplexing scheme(s), e.g., SC-FDM, CDM, etc.

Figure 10:
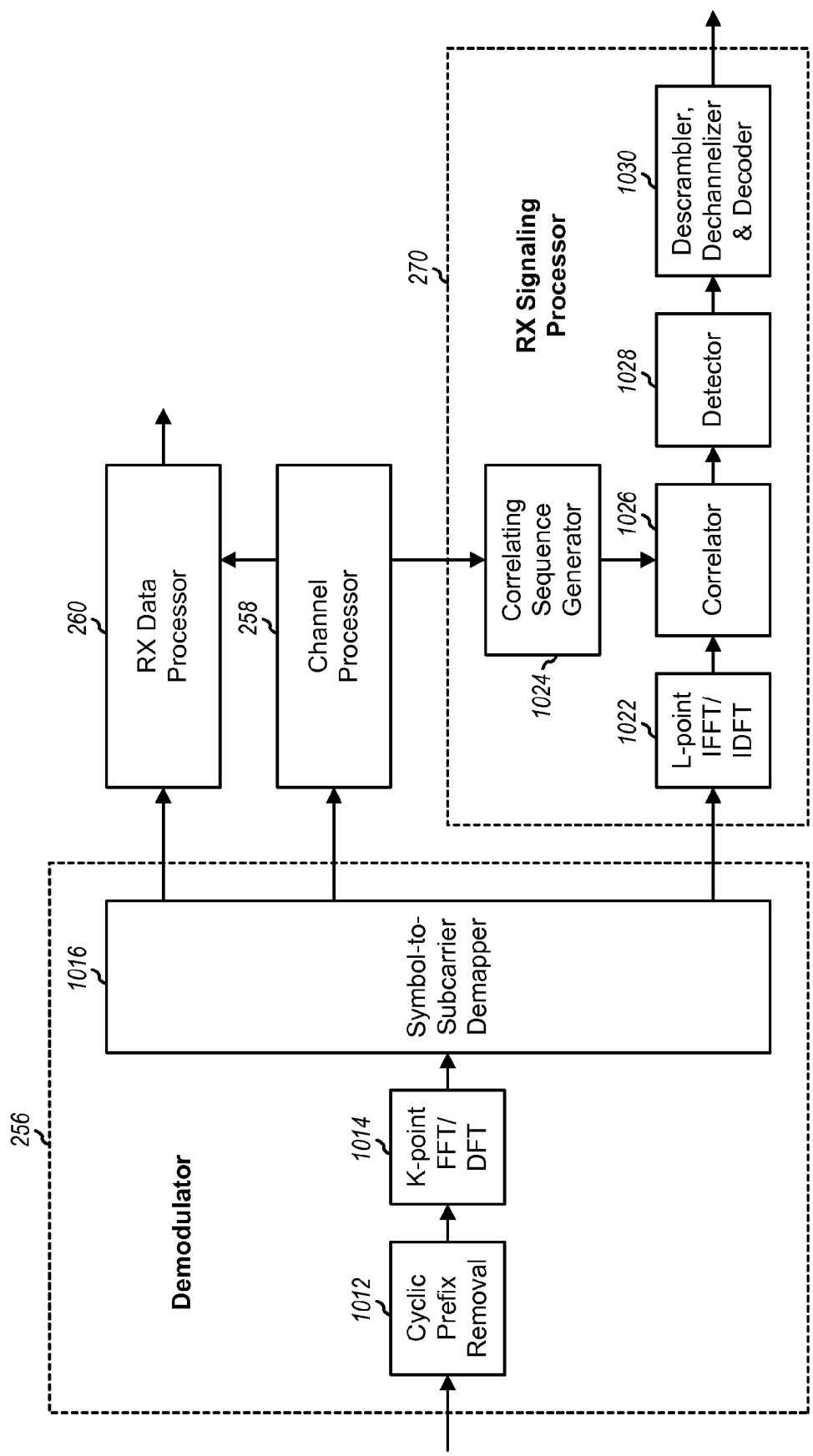
FIG. 10 shows a block diagram of processing units at the base station.

FIG. 10 shows a block diagram of a design of demodulator 256 and RX signaling processor 270 at base station 110 in FIG. 2. Within demodulator 256, a cyclic prefix removal unit 1012 receives samples from receiver 254, removes the cyclic prefix in each received OFDM symbol, and provides the corresponding useful portion. An FFT/DFT unit 1014 performs a K-point FFT/DFT on the K samples of each useful portion and provides K received symbols. A symbol-to-subcarrier demapper 1016 obtains the K received symbols for the K total subcarriers in each symbol period, provides received pilot symbols to channel processor 258, provides received data symbols to RX data processor 260, and provides received signaling symbols to RX signaling processor 270. Channel estimator 258 may derive a channel impulse response estimate based on the received pilot symbols and provides the channel taps to processors 260 and 270. RX data processor 260 processes (e.g., symbol demaps, deinterleaves, and decodes) the received data symbols and provides decoded data.

Within RX signaling processor 270, an IFFT/IDFT unit 1022 performs IFFT/IDFT on L received signaling symbols $\tilde{A}_m$ in each symbol period and provides a corresponding sub-sequence $Y_m$ containing L samples, e.g., as shown in FIG. 5. For each hypothesized signaling message, a correlating sequence generator 1024 generates a correlating sequence for each of $N_{tap}$ channel tap delays, e.g., as shown in FIG. 6, 7 or 8. For each hypothesized signaling message, a correlator 1026 performs correlation between the received sequence and the correlating sequence for each channel tap delay, e.g., as shown in equation (2), combines the correlation results for all $N_{tap}$ channel tap delays, e.g., as shown in equation (3), and provides a final correlation result Q for that hypothesized signaling message. A detector 1028 receives the final correlation results for different hypothesized signaling messages and determines whether any of these signaling messages was received. Detector 1028 may compare the final correlation result Q for each hypothesized signaling message against a threshold $Q_{th}$ and determines whether or not that signaling message was sent based on the comparison result. Detector 1028 may also determine the threshold based on noise and interference estimates and/or other information. A unit 1030 performs descrambling, dechannelization, and decoding of each detected signaling sequence and provides the corresponding decoded message.

Figure 11:
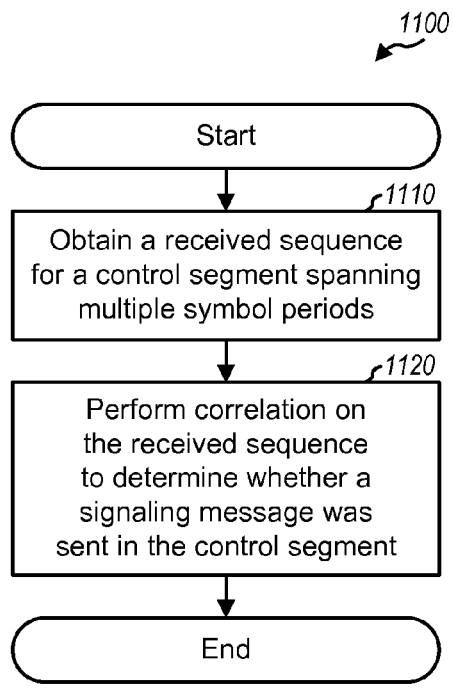
FIGS. 11 and 12 show a process for receiving a signaling message.

FIG. 11 shows a design of a process 1100 for receiving a signaling message. A received sequence may be obtained for a control segment spanning multiple symbol periods (block 11110). The received sequence may include a time-domain signaling sequence sent in multiple OFDM symbols for a signaling message. Correlation may be performed on the received sequence to determine whether a signaling message was sent in the control segment (block 11120).

Figure 12:
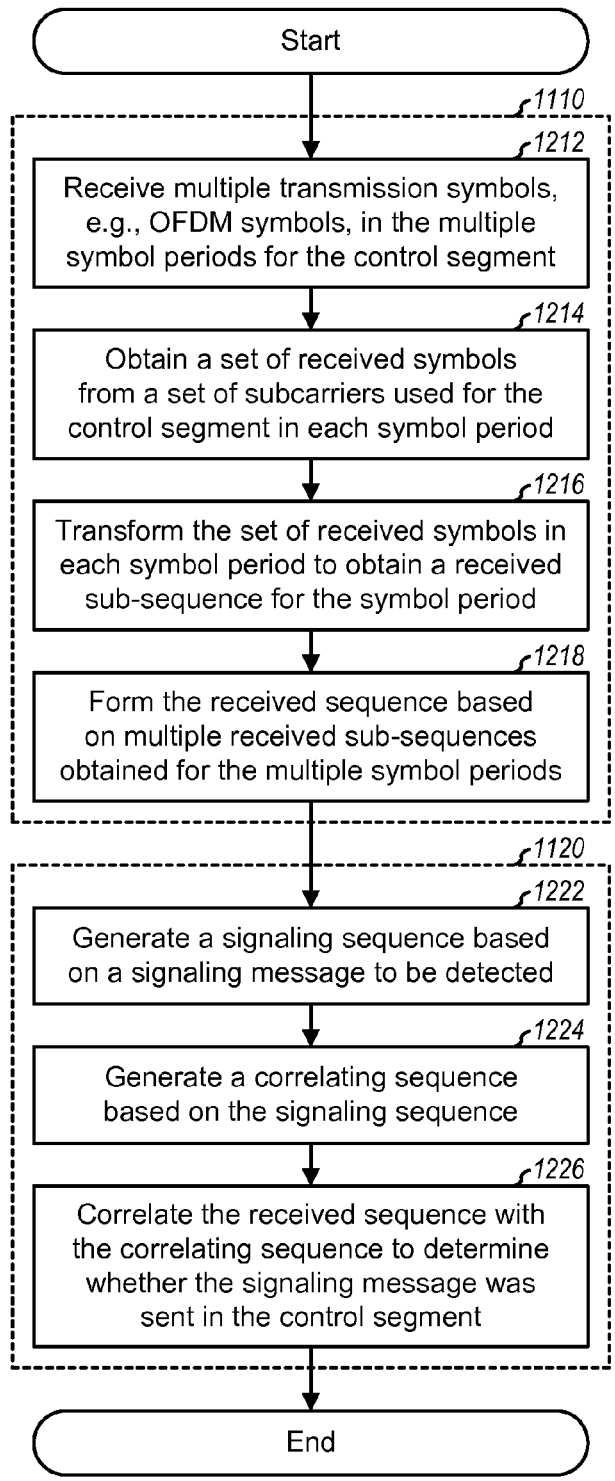

FIG. 12 shows a design of blocks 1110 and 1120 in FIG. 11. For block 1110, multiple transmission symbols (e.g., OFDM symbols) may be received in multiple symbol periods in which the control segment was sent (block 1212). The control segment may be sent with a first multiplexing scheme (e.g., CDM), and the transmission symbols may be generated based on a second multiplexing scheme (e.g., OFDM). A cyclic prefix may be removed from each received transmission symbol to obtain a received useful portion, which may be transformed to obtain received symbols for the K total subcarriers. A set of received symbols may be obtained from a set of subcarriers used for the control segment in each symbol period (block 1214). The set of received symbols in each symbol period may be transformed to obtain a received sub-sequence for the symbol period (block 1216). The received sequence may be formed based on (e.g., by concatenating) multiple received sub-sequences obtained for the multiple symbol periods (block 1218).

For block 1120, a signaling sequence may be generated based on a signaling message to be detected, e.g., by mapping the signaling message to a coded message (e.g., a Walsh sequence) and processing (e.g., channelizing and scrambling)

the coded message to obtain the signaling sequence (block 1222). A correlating sequence may be generated based on the signaling sequence in one of several manners (block 1224). The received sequence may then be correlated with the correlating sequence to determine whether the signaling message was sent in the control segment (block 1226).

In one design for generating the correlating sequence in block 1224, the signaling sequence is partitioned into multiple sub-sequences, one sub-sequence for each of the multiple symbol periods in which the control segment was sent. Each sub-sequence is cyclically shifted, e.g., by an amount determined by a channel tap delay. The correlating sequence is then formed based on (e.g., by concatenating) the multiple cyclically shifted sub-sequences. If the channel tap delay exceeds a cyclic prefix length, then a portion of each cyclically shifted sub-sequence, which corresponds to the portion of the channel tap delay that exceeds the cyclic prefix length, may be zeroed out, e.g., as shown in FIG. 7.

In another design for generating the correlating sequence in block 1224, the signaling sequence is partitioned into multiple sub-sequences, one sub-sequence for each symbol period in which the control segment was sent. A first sequence is obtained by appending a cyclic prefix to each of the multiple sub-sequences. A second sequence is obtained by appending at least one zero to the first sequence, with the number of zeros being dependent on the channel tap delay. The second sequence is partitioned into multiple second sub-sequences, one second sub-sequence for each symbol period. A cyclic prefix is removed from each second sub-sequence. The correlating sequence is then generated based on (e.g., by concatenating) multiple second sub-sequences with the cyclic prefix removed, e.g., as shown in FIG. 8.

For block 1226, a correlation result may be obtained for the correlation between the received sequence and the correlating sequence. Correlation may be performed for each of at least one channel tap, and a final correlation result may be obtained based on the correlation results for all channel taps. The final correlation result may be compared against a threshold, which may be determined based on the estimated noise energy. Whether the signaling message was sent in the control segment may be determined based on the comparison between the final correlation result and the threshold.

Correlation may be performed for different possible signaling messages that might have been sent in the control segment. The processing for each possible signaling message may proceed as described above for FIGS. 11 and 12.

Figure 13:
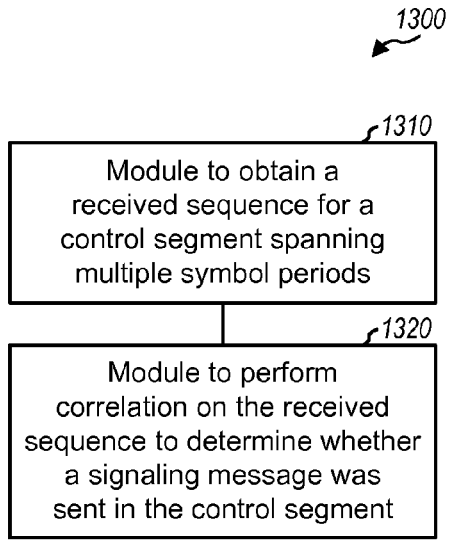
FIGS. 13 and 14 show an apparatus for receiving a signaling message.

FIG. 13 shows a design of an apparatus 1300 for receiving a signaling message. Apparatus 1300 includes means for obtaining a received sequence for a control segment spanning multiple symbol periods (module 1310), and means for performing correlation on the received sequence to determine whether a signaling message was sent in the control segment (module 1320). Modules 1310 and 1320 may comprise processors, electronics devices, hardware devices, electronics components, logical circuits, memories, etc., or any combination thereof.

Figure 14:
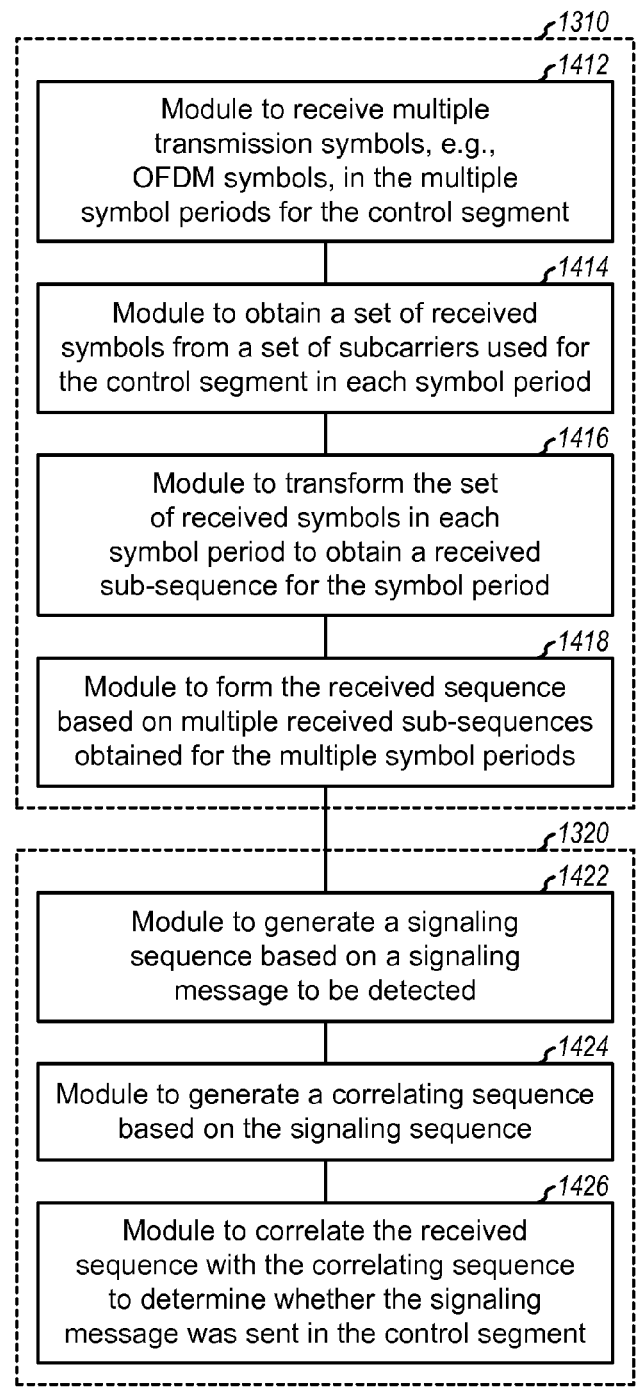

FIG. 14 shows a design of modules 1310 and 1320 in FIG. 13. Module 1310 includes means for receiving multiple transmission symbols (e.g., OFDM symbols) in the multiple symbol periods for the control segment (module 1412), means for obtaining a set of received symbols from a set of subcarriers used for the control segment in each symbol period (module 1414), means for transforming the set of received symbols in each symbol period to obtain a received sub-sequence for the symbol period (block 1416), and means for forming the received sequence based on multiple received sub-sequences obtained for the multiple symbol periods (module 1418). Module 1320 includes means for generating a signaling sequence based on a signaling message to be detected (module 1422), means for generating a correlating sequence based on the signaling sequence (module 1424), and means for correlating the received sequence with the correlating sequence to determine whether the signaling message was sent in the control segment (module 1426). Modules 1412 to 1426 may comprise processors, electronics devices, hardware devices, electronics components, logical circuits, memories, etc., or any combination thereof.

The techniques described herein may be implemented by various means. For example, these techniques may be implemented in hardware, firmware, software, or a combination thereof. For a hardware implementation, the processing units at an entity (e.g., a terminal or a base station) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software codes may be stored in a memory (e.g., memory 242 or 282 in FIG. 2) and executed by a processor (e.g., processor 240 or 280). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
a processor configured to:
  obtain a received sequence for a control segment spanning multiple symbol periods in a frame; and
  perform correlation on the received sequence to determine whether a signaling message was sent in the control segment;
  generate a signaling sequence based on the signaling message, to generate a correlating sequence based on the signaling sequence, and to correlate the received sequence with the correlating sequence to determine whether the signaling message was sent in the control segment and
  partition the signaling sequence into multiple sub-sequences, one sub-sequence for each of the multiple symbol periods, to cyclically shift each of the multiple sub-sequences, and to form the correlating sequence based on multiple cyclically shifted sub-sequences,
and
a memory coupled to the processor.

2. The apparatus of claim 1, wherein the processor is configured to cyclically shift each of the multiple sub-sequences by an amount determined by a channel tap delay.

3. The apparatus of claim 2, wherein the processor is configured to zero out a portion of each cyclically shifted sub-sequence, the zeroed-out portion corresponding to a portion of the channel tap delay exceeding a cyclic prefix length.

4. The apparatus of claim 1, wherein the processor is configured to partition the signaling sequence into multiple sub-sequences, one sub-sequence for each of the multiple symbol periods, to obtain a first sequence by appending a cyclic prefix to each of the multiple sub-sequences, to obtain a second sequence by appending at least one zero to the first sequence, and to generate the correlating sequence based on the second sequence.

5. The apparatus of claim 4, wherein the number of zeros appended to the first sequence is determined by a channel tap delay.

6. The apparatus of claim 4, wherein the processor is configured to partition the second sequence into multiple second sub-sequences, one second sub-sequence for each of the multiple symbol periods, to remove a cyclic prefix from each of the multiple second sub-sequences, and to generate the correlating sequence based on multiple second sub-sequences with the cyclic prefix removed.

7. The apparatus of claim 1, wherein the processor is configured to obtain a correlation result for the correlation between the received sequence and the correlating sequence, to compare the correlation result against a threshold, and to determine whether the signaling message was sent in the control segment based on the comparison between the correlation result and the threshold.

8. The apparatus of claim 7, wherein the processor is configured to determine the threshold based on estimated noise energy.

9. The apparatus of claim 1, wherein the processor is configured to perform correlation on the received sequence for each of at least one channel tap, to obtain a final correlation result based on at least one correlation result for the at least one channel tap, and to determine whether the signaling message was sent in the control segment based on the final correlation result.

10. The apparatus of claim 1, wherein the control segment is sent with a first multiplexing scheme in multiple transmission symbols generated based on a second multiplexing scheme.

11. The apparatus of claim 1, wherein the control segment is sent with code division multiplexing (CDM) in multiple orthogonal frequency division multiplexing (OFDM) symbols sent in the multiple symbol periods.

12. The apparatus of claim 1, wherein the processor is configured to receive multiple orthogonal frequency division multiplexing (OFDM) symbols in the multiple symbol periods, to remove a cyclic prefix from each of the multiple OFDM symbols, and to obtain the received sequence based on the multiple OFDM symbols with the cyclic prefix removed.

13. The apparatus of claim 1, wherein the processor is configured to obtain a set of received symbols, from a set of subcarriers used for the control segment, in each of the multiple symbol periods, to transform the set of received symbols in each symbol period to obtain a sub-sequence for the symbol period, and to form the received sequence based on multiple sub-sequences obtained for the multiple symbol periods.

14. The apparatus of claim 1, wherein the processor is configured to map the signaling message to a coded message, to process the coded message to obtain a signaling sequence, and to perform correlation on the received sequence based on the signaling sequence.

15. The apparatus of claim 14, wherein the processor is configured to select a Walsh sequence from a plurality of Walsh sequences based on the signaling message, and to provide the selected Walsh sequence as the coded message.

16. A method comprising:
obtaining in a receiver a received sequence for a control segment spanning multiple symbol periods in a frame; and
performing correlation in the receiver on the received sequence to determine whether a signaling message was sent in the control segment
generating a signaling sequence based on the signaling message;
partitioning the signaling sequence into multiple sub-sequences, one sub-sequence for each of the multiple symbol periods;
cyclically shifting each of the multiple sub-sequences; and
forming a correlating sequence based on multiple cyclically shifted sub-sequences, and wherein the performing correlation comprises correlating the received sequence with the correlating sequence to determine whether the signaling message was sent in the control segment.

17. The method of claim 16, wherein the cyclically shifting comprises cyclically shifting each of the multiple sub-sequences by an amount determined by a channel tap delay.

18. The method of claim 17, further comprising:
zeroing out a portion of each cyclically shifted sub-sequence, the zeroed-out portion corresponding to a portion of the channel tap delay exceeding a cyclic prefix length.

19. The method of claim 16, further comprising:
generating a signaling sequence based on the signaling message;
partitioning the signaling sequence into multiple sub-sequences, one sub-sequence for each of the multiple symbol periods;
obtaining a first sequence by appending a cyclic prefix to each of the multiple sub-sequences;
obtaining a second sequence by appending at least one zero to the first sequence;
partitioning the second sequence into multiple second sub-sequences, one second sub-sequence for each of the multiple symbol periods;
removing a cyclic prefix from each of the multiple second sub-sequences; and
generating a correlating sequence based on multiple second sub-sequences with the cyclic prefix removed, and wherein the performing correlation comprises correlating the received sequence with the correlating sequence to determine whether the signaling message was sent in the control segment.

20. An apparatus comprising:
means for obtaining a received sequence for a control segment spanning multiple symbol periods in a frame; and
means for performing correlation on the received sequence to determine whether a signaling message was sent in the control segment
means for generating a signaling sequence based on the signaling message;
means for partitioning the signaling sequence into multiple sub-sequences, one sub-sequence for each of the multiple symbol periods;
means for cyclically shifting each of the multiple sub-sequences; and
means for forming a correlating sequence based on multiple cyclically shifted sub-sequences, and wherein the means for performing correlation comprises means for correlating the received sequence with the correlating sequence to determine whether the signaling message was sent in the control segment.

21. The apparatus of claim 20, wherein the means for cyclically shifting comprises means for cyclically shifting each of the multiple sub-sequences by an amount determined by a channel tap delay.

22. The apparatus of claim 21, further comprising:
means for zeroing out a portion of each cyclically shifted sub-sequence, the zeroed-out portion corresponding to a portion of the channel tap delay exceeding a cyclic prefix length.

23. The apparatus of claim 20, further comprising:
means for generating a signaling sequence based on the signaling message;
means for partitioning the signaling sequence into multiple sub-sequences, one sub-sequence for each of the multiple symbol periods;
means for obtaining a first sequence by appending a cyclic prefix to each of the multiple sub-sequences;
means for obtaining a second sequence by appending at least one zero to the first sequence;
means for partitioning the second sequence into multiple second sub-sequences, one second sub-sequence for each of the multiple symbol periods;
means for removing a cyclic prefix from each of the multiple second sub-sequences; and
means for generating a correlating sequence based on multiple second sub-sequences with the cyclic prefix removed, and wherein the means for performing correlation comprises means for correlating the received sequence with the correlating sequence to determine whether the signaling message was sent in the control segment.

24. A non-transitory computer-readable medium including instructions stored thereon, comprising:
a first instruction set for obtaining a received sequence for a control segment spanning multiple symbol periods in a frame; and
a second instruction set for performing correlation on the received sequence to determine whether a signaling message was sent in the control segment
a third instruction set for generating a signaling sequence based on the signaling message;
a fourth instruction set for partitioning the signaling sequence into multiple sub-sequences, one sub-sequence for each of the multiple symbol periods;
a fifth instruction set for cyclically shifting each of the multiple sub-sequences; and
a sixth instruction set for forming a correlating sequence based on multiple cyclically shifted sub-sequences, and wherein the means for performing correlation comprises means for correlating the received sequence with the correlating sequence to determine whether the signaling message was sent in the control segment.

* * * * *